Dec. 7, 1926. 1,610,008
O. C. L. HIRSCH
SAUSAGE LINKING MACHINE
Filed Oct. 8, 1923  4 Sheets-Sheet 1

Inventor.
Otto C. L. Hirsch.
By (signature) Atty.

Dec. 7, 1926.
O. C. L. HIRSCH
1,610,008
SAUSAGE LINKING MACHINE
Filed Oct. 8, 1923    4 Sheets-Sheet 2
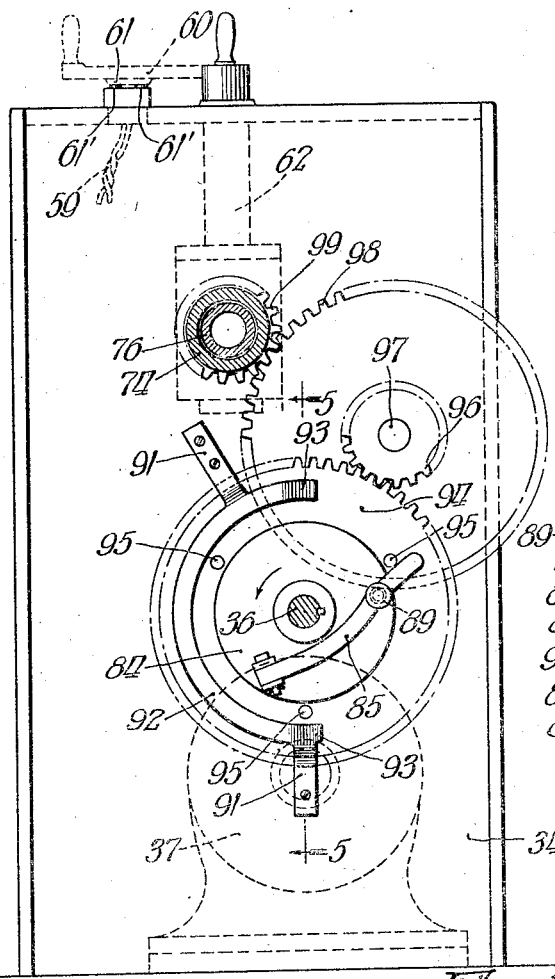
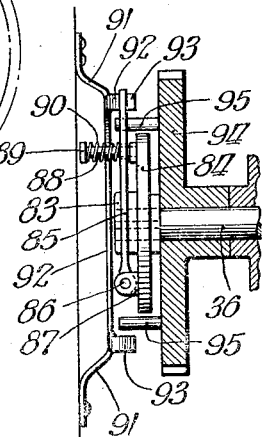
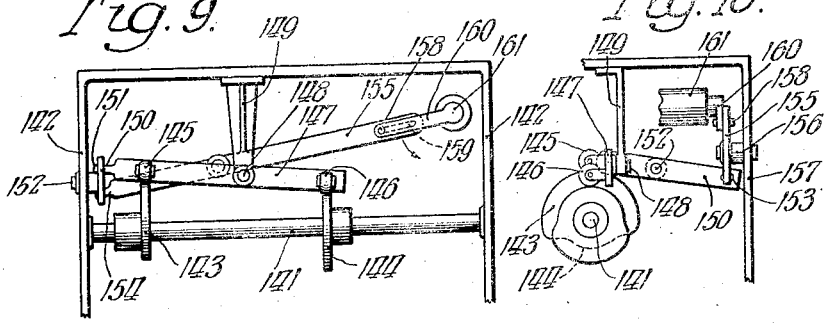
Inventor,
Otto C. L. Hirsch.
By Max W. Zabel Atty.

Dec. 7, 1926.  1,610,008
O. C. L. HIRSCH
SAUSAGE LINKING MACHINE
Filed Oct. 8, 1923   4 Sheets-Sheet 3
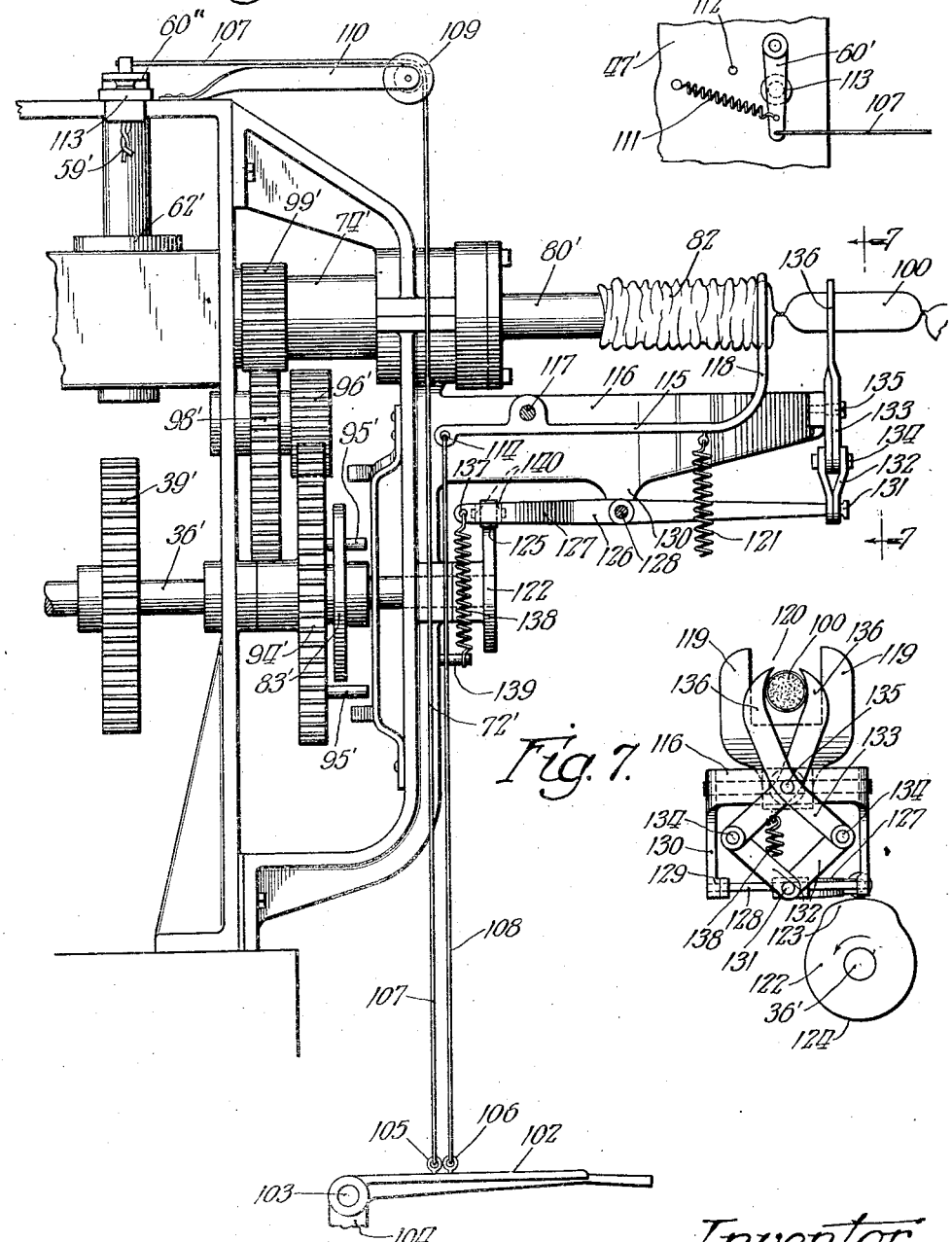
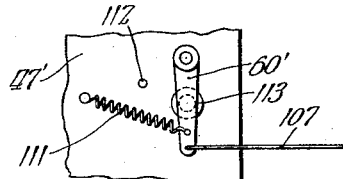
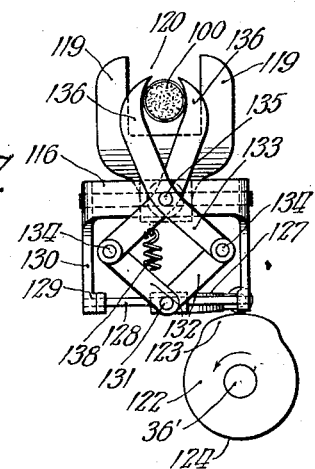
Inventor.
Otto C. L. Hirsch.

Dec. 7, 1926.
O. C. L. HIRSCH
1,610,008
SAUSAGE LINKING MACHINE
Filed Oct. 8, 1923      4 Sheets-Sheet 4
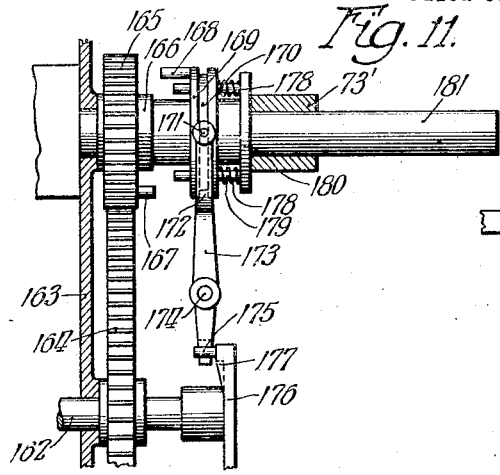
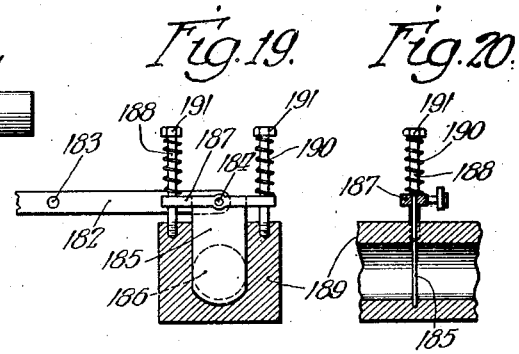
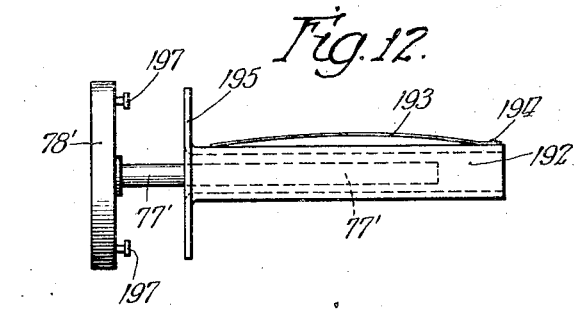
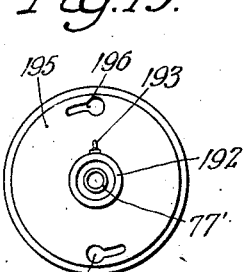
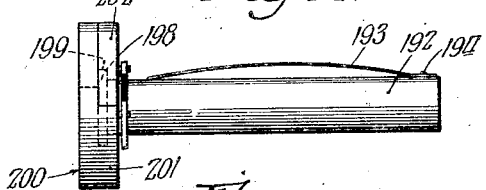
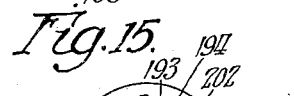
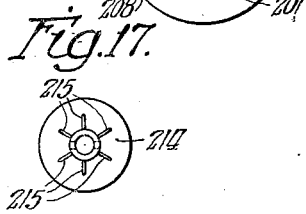
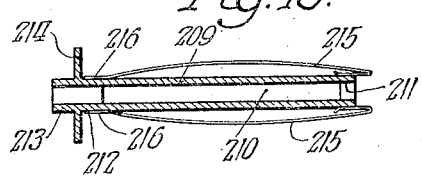
Inventor.
Otto C. L. Hirsch.

Patented Dec. 7, 1926.

1,610,008

UNITED STATES PATENT OFFICE.

OTTO C. L. HIRSCH, OF CHICAGO, ILLINOIS.

SAUSAGE-LINKING MACHINE.

Application filed October 8, 1923. Serial No. 667,264.

My invention relates to sausage linking machines and more particularly to a linking device that is adapted to be used in combination with a stuffer.

It is a purpose of my invention to provide a sausage linking device that is adapted to be attached to the outlet of a stuffer, said linking device twisting each sausage after the same has been filled by the stuffer. That is, instead of stuffing an entire casing and then linking the same, as has been customary, the amount of meat necessary to form one link of the casing is admitted to the casing and then the casing is twisted to form the link. After this link has been formed more meat is admitted of a quantity sufficient to fill the next link after which this link is twisted and so on until the entire casing has been stuffed and linked.

It has been found that in devices of this character difficulty is experienced in getting the links of uniform length and it is a purpose of my invention to provide a sausage linking device of the above mentioned character wherein the links will be made of a uniform length although the casings may be of different texture and quality and of different diameters.

In order to accomplish this purpose I have provided a passageway leading from the outlet of the stuffer to the twisting mechanism which is provided with valve mechanism that is alternately opened and closed so as to admit the meat to the casing while the same is not being rotated and to shut off the supply of meat while the same is being rotated, and valve mechanism which is adjustable to vary the amount of meat passing through the tube in accordance with the quality, size and condition of the casing that is being stuffed.

It is a further purpose of the invention to provide valve mechanism in the above mentioned passageway that is related to the starting mechanism of the machine in such a manner that the valve will be closed when the machine is not running and will be opened as soon as the machine is started and to provide means for controlling the valve mechanism that is alternately opened and closed which operates in timed relationship to the operation of the twisting mechanism which also is alternately twisting and inoperative.

It is still another purpose of the invention to provide means for twisting the links, comprising a rotatable member, upon which the unfilled casing is mounted, and a stationary member for holding the adjoining portion of the casing that has been filled so that as the rotatable member rotates the casing will be twisted to form a link. In order to assure proper feeding of the casing so as to have sufficient casing available at the point where the same is filled to properly form the links, it is necessary that the operator move the casing mounted on the rotatable member toward the end thereof at which the twisting takes place and in order to avoid any chance of injury to the operator a guard is provided which is so mounted that the same is moved into position when the machine is started and automatically moves out of position when the machine is stopped, thus being out of the way for placing a new casing on the twisting member.

It is another object of the invention to provide means on said rotating member for holding the sausage casing in a slightly stretched condition crosswise thereof, thus aiding in feeding the same in such condition to the point where filling and twisting take place that there will be no wrinkles in the casing.

Other objects and advantages of the invention will appear as the description of the accompanying drawings proceeds. However, I desire to have it distinctly understood that I do not intend to limit myself to the exact details shown or described but that I intend to include as part of my invention all such obvious changes and modifications of parts as would occur to a person skilled in this art and as would fall within the scope of the claims.

In the drawings:

Fig. 3 is an enlarged sectional view taken on the line 3—3 of Fig. 1;

Fig. 5 is a sectional view of the clutch device shown in Fig. 3 taken on the line 5—5 of Fig. 3;

Fig. 6 is a fragmentary side elevation showing a slightly different embodiment of my invention from that shown in Fig. 1;

Fig. 7 is a section taken on the line 7—7 of Fig. 6;

Fig. 8 is a fragmentary plan view of the controlling switch mechanism used in the device shown in Fig. 6;

Fig. 9 is a fragmentary plan view showing a modified means for operating the valve that is alternately opened and closed;

Fig. 10 is a fragmentary side elevation of the devices shown in Fig. 9;

Fig. 11 is a fragmentary vertical sectional view showing alternative means for driving the twisting mechanism;

Fig. 12 is a detail side elevational view of one form of casing holding twisting means that may be used;

Fig. 13 is an end elevation thereof;

Fig. 14 is a view similar to Fig. 12 of still another form of casing supporting means;

Fig. 15 is an end elevation thereof;

Fig. 16 is a detail side elevation of still another form of rotating casing supporting means;

Fig. 17 is an end elevation thereof;

Fig. 18 is a longitudinal sectional view thereof;

Fig. 19 is a transverse sectional view of a form of valve mechanism which may be used with my device, the operating link being partly broken away; and Fig. 20 is a section of the mechanism shown in Fig. 19 taken at right angles thereto.

Figure 1:
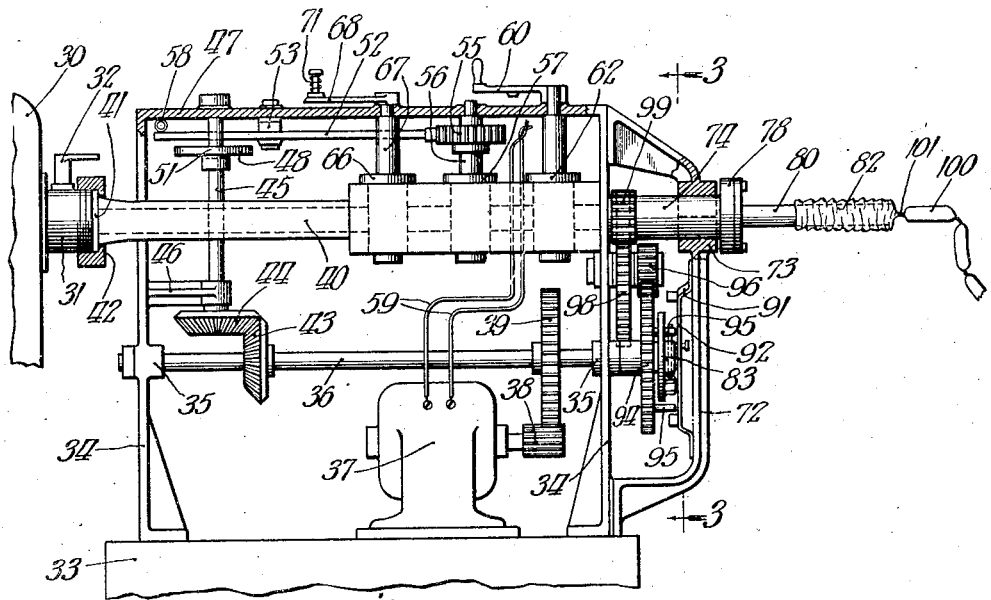
Fig. 1 is a view partly in side elevation and partly in vertical section of my improved linking device attached to the outlet of a stuffer.

Referring in detail to the drawings, in Fig. 1 is shown a fragmentary section of a stuffer 30 having an outlet tube 31 and provided with the usual valve mechanism 32. Connected with said outlet tube is a linking mechanism which comprises a base member 33 upon which the vertically extending members 34 of the framework are mounted. Said members 34 are provided with bearings 35 for the main drive shaft 36 which is driven from a motor 37 mounted on the base 33 through the pinion 38 and gear 39. A tubular member 40 is also non-rotatably mounted on the vertically extending members 34 and is provided with a flanged end portion 41 which is secured to the end of the outlet tube 31 of the stuffer by means of a flanged nut 42 screwthreadedly mounted on said member 31.

The shaft 36 carries a beveled gear 43 which meshes with a beveled gear 44 mounted on the shaft 45 which is journaled in the bracket 46 and in the top member 47 of the framework. The shaft 45 carries a cam 48 which is provided with a high portion 49 and a low portion 50, the high portion 49 being substantially twice as long as the low portion 50, or in other words, the high portion occupies substantially two thirds of the circumference of the cam and the low portion substantially one third thereof. Co-operating with said cam is a roller 51 which is mounted on the lever 52 pivoted at 53 to the top member 47 of the framework. The lever is provided at one end thereof with a curved rack member 54 which meshes with the gear 55 provided on the shaft 56 of the valve member 57. The opposite end of the lever is provided with a tension spring 58 which is secured to any suitable part of the framework so as to hold the roller against the cam.

Figure 2:
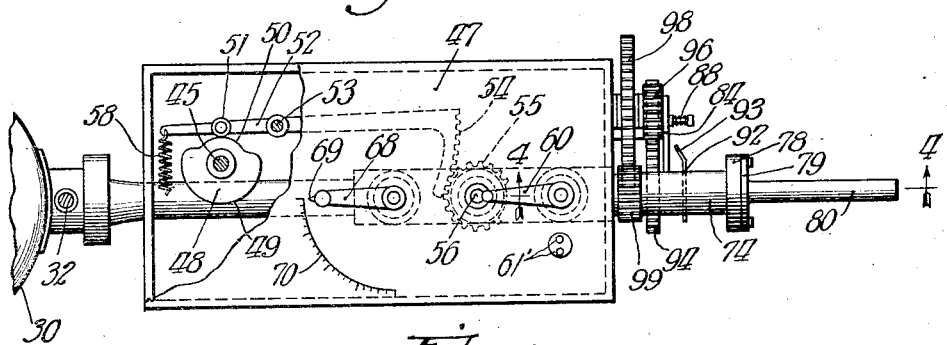
Fig. 2 is a top plan view of the device shown in Fig. 1.

It will be seen that as the shaft 36 is rotated in the direction of the arrow in Fig. 3 the shaft 45 will be rotated clockwise in Fig. 2 which will cause the lever 52 to be swung back and forth and cause the rack 54 to reciprocate, thus causing an oscillation of the gear 55, the proportion of the parts being such that the range of movement of the rack 54 moves the gear 55 through a sufficient arc that the valve mechanism carried by the shaft 56 mounted in the tube 40 will be opened during the time that the high portion of the cam 49 engages with the roller 51 and will be returned to closed position by the spring 58 during the time the roller 51 is in engagement with the low portion 50 of the cam. Thus, the valve 57 will be opened two thirds of the time and closed one third of the time the machine is running.

Figure 4:
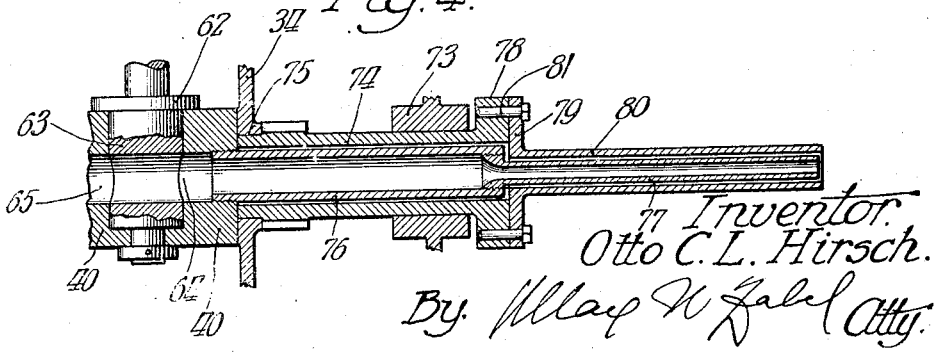
Fig. 4 is an enlarged section taken on the line 4—4 of Fig. 2.

The motor 37 is provided with leads 59 which pass from a source of current through a starting switch having a handle 60 carrying a contact member 61 engaging with the contact members 61' when the current for the motor is on. The handle 60 also serves as a handle for the valve member 62 being so arranged that the valve 62 is in open position when the handle 60 is in engagement with the contact 61' and in closed position when the handle 60 is out of engagement with the contact 61'. The valve may be of any desired type, a rotatable valve member 63 being shown in Fig. 4 which is provided with a transverse opening 64 therein whereby the passage 65 in the tube 40 is open when the valve is in the position shown in Fig. 4 and closed when the valve is in a position substantially at 90 degrees to that shown in Fig. 4. The valve 57 is made in a similar manner as is also the valve 66, said valve 66 being provided with a shaft portion 67 extending upwardly therefrom and with a handle 68 provided with a pointer 69 co-operating with a scale 70 provided on the top plate 47 of the machine and having a spring pressed pin 71 frictionally engaging with said top plate to hold the valve in a set position.

It will be seen that the effective size of the opening of the valve 66 can be varied in accordance with the position of the handle 68 thus regulating the size of the orifice through which the meat from the stuffer passes toward the open end of the tube 40, this valve mechanism 66 being provided so as to regulate the amount of meat passing to the twisting device in accordance with the conditions existing in the casing that is on the machine. The scale 70 may be provided with any desired markings, such as lengths of links in inches or any arbitrary scale.

From the above it will be seen that the meat feeding mechanism comprises a mechanically operated valve that is driven from the main drive shaft of the machine so as to be alternately opened and closed, being open two thirds of the time and closed one third of the time, a valve mechansm that can be set to vary the size of the orifice through which the meat passes to the stuffer and a valve mechanism that is linked with the starting mechanism in such a manner that when the motor is operating and the machine is started said valve is opened and when the motor is stopped the valve is closed.

The twisting mechanism is mounted on a yoke-like bracket member 72 extending endwise from one of the vertically extending frame members 34, said member 72 being provided with a bearing 73 for a rotatable member 74 which also rotates in a bearing 75 in the end member of the frame 34. Mounted within said rotating member 74 is a stationary filling tube 76 which is provided with a reduced extension 77 that feeds the meat into the casing at the open end thereof. The stationary member 76 is screw-threadedly connected with the tube 40 as will be evident from Fig. 4. The rotatable member 74 is provided with a flange 78 to which is secured the flange 79 of the tubular member 80 by means of bolts 81. The tubular member 80 is provided for receiving the sausage casing thereon, said sausage casing being pulled over the tube 80 in the manner shown in Fig. 1, the casing being indicated by the numeral 82. Thus, it will be seen that while the member carrying the casing 82 rotates, the filling tube leading from the stuffing mechanism is stationary to the very point where discharge of the meat into the casing occurs, thus making the device more simple, the rotating parts much lighter and making it much easier to provide tight joints in the filling tube.

In the form shown in the Figs. 1 to 5 inclusive, the means for rotating the rotatable member 74 and consequently the casing receiving member 80 comprises a clutch member 83 mounted on the shaft 36, said clutch member 83 comprising a disk 84 keyed to the shaft 36 upon which is pivotally mounted a finger 85, said finger 85 being pivoted at 86 on the lug 87 on said plate. Extending through an opening in the finger 85 is a bolt 88 mounted on said plate 84 having a head 89 and having a coil spring 90 mounted between said head and the finger 85. Thus, the finger 85 is pressed toward the plate 84 by spring pressure. Mounted on the bracket 72 is a bracket member 91 which carries a stationary cam 92 having inclined portions 93. The finger 85, as will be clear from Fig. 5, engages in back of the cam 92 or between the cam and the bracket 72. Consequently, as the plate 84 rotates, the finger 85 will be thrown toward the left in Fig. 5 when the same is in engagement with the cam 92 and will be in the position shown in Fig. 5 when out of engagement with said cam or just as it engages with the inclined portions 93 at the ends of the cam.

Loosely mounted on the shaft 36 is a gear 94 which is provided with a plurality of pins 95 projecting therefrom, there being preferably three in number as shown in Fig. 3. The length of the cam 92 and the arrangement of the pins 95 is such that the finger 85 will only be engaging with a pin 95 through substantially one third of a revolution of the plate 84 or through only substantially one third of the time that the shaft 36 rotates. Consequently, the gear 94 will be rotated only one third of the time that the shaft 36 is rotating. Meshing with the gear 94 is a pinion 96 which is keyed on a shaft 97 that carries the gear 98, said gear 98 meshing with the gear teeth 99 provided on the rotatable member 74. It will thus be seen that as the gear 94 rotates, the rotatable member 74 and the casing supporting member 80 are rotated. Accordingly, the members 74 and 80 are rotated only during one third of the time that the shaft 36 rotates, the arrangement of the parts being such that this rotation takes place at the time when the roller 51 is in engagement with the low portion 50 of the cam 48. Thus, twisting of the casing takes place when the valve member 57 is closed and the casing rotating or twisting device will be stationary when the valve member 57 is open.

In the form shown in Figs. 1 to 5 inclusive, the operator holds the filled links 100 of the casing and as the member 80 rotates, a twist of the casing occurs at 101 due to the fact that the portion 100 thereof is held stationary and the portion on the member 80 is rotated. The ratio of the gears is preferably such that the member 80 rotates three times during the time that the shaft 36 rotates one-third of a revolution.

In the form of the device shown in Figs. 1 to 5 inclusive the valve 62 and the controlling handle 60 are manually operated, while in the form shown in Figs. 6 to 8 inclusive said devices are operated by means of a foot pedal which also controls the movable guard for the casing receiving rotating member. Also, in the form shown in Figs. 1 to 5 inclusive, it is necessary for the operator to hold the linked sausages in order that twisting will take place, whereas in the forms shown in Figs. 6 to 8 means is provided for holding the linked sausages that is automatic in operation.

Referring to Fig. 6 it will be seen that a foot pedal 102 is provided which is pivoted in any suitable manner at 103 to a suitable support 104. Secured to said foot pedal 102 is a pair of eyes 105 and 106 to which the flexible members 107 and 108 are secured. The flexible member 107 leads over a pulley 109 provided on a bracket 110 mounted on the frame work of the machine. Said flexible member 107 is secured at the other end thereof to the switch member 60 which is similar to the member 60 except that instead of being manually operated a spring 111 is provided secured to the top plate 47' which tends to move the handle 60 into engagement with a stop 112. Thus, when the pedal 102 is depressed, which is the position thereof shown in Fig. 6, the handle 60 is pulled to the position shown in Fig. 8 and contact is made at the switch member 113 to which the leads 59' passing from the source of current to the motor extend. The handle 60 also operates the valve 62' in a similar manner to that in which the handle 60 operates the valve 62. Accordingly, a depression of the pedal 102 also opens the valve 62'.

The remainder of the valve mechanism in the form of the device shown in Fig. 6 is the same as that shown in Figs. 1 to 5 inclusive and has, accordingly, been omitted, only a portion of the driving mechanism and the drive for the twisting device being shown for the purpose of clearly indicating the operation of the guard and the linked sausage holding means described below.

The parts that correspond to the parts shown in Figs. 1 to 5 inclusive in Fig. 6 bear corresponding numerals, the numeral 39' indicating the gear driven from the pinion on the motor which is mounted on the shaft 36' corresponding to the shaft 36 which carries the gear 94' loosely thereon and which has the clutch plate 83' keyed thereto, the gear 94' carrying the lugs 95' which are engaged by a finger similar to the finger 85 shown in Fig. 5 to rotate the gear 94' which drives the rotatable member 74' through the gears 96', 98' and 99', said rotatable member 74' carrying a casing receiving member 80' corresponding to the member 80 in Fig. 1 upon which the casing 82 is mounted.

The flexible member 108 has the end thereof, opposite that secured to the pedal 102, secured to an eye 114 on the end of the lever 115 which is pivoted to a bracket 116 on the framework by means of the pivot member 117. The lever 115 has an upturned end portion 118 which is forked as indicated at 119 in Fig. 7, thus providing a U-shaped opening 120 between the two arms 119 of the lever. The casing is placed on the member 80 or 80', as the case may be, in a somewhat bunched condition, as shown in Figs. 1 and 6, and is constantly being slid over toward the right in said figures by the operator of the machine so the casing will be properly fed to the twisting mechanism so that it will be neither wrinkled nor be under too much tension to cause tearing of the same. The bifurcated end on the member 118 is provided so as to form a guard to prevent the fingers of the operator from coming into contact with the linked sausage holding mechanism which will be described below.

It will be evident that when the pedal 102 is depressed the lever 115 will be in such a position that the forked arms 119 thereof will be in the position shown in Fig. 7, while if the pedal 102 is released and moves upwardly, due to the action of the spring 111 and the spring 121 secured to the lever 115 and to any part of the frame of the machine, the lever 115 will be moved crosswise in Fig. 6 and the portions 119 thereof will move out of position surrounding the end of the member 80' thus being out of the way for the placing of a new casing over the tube 80'.

The shaft 36' is provided with a cam 122 keyed to the end thereof which has a high portion 123, extending over substantially one-third the circumference of the cam, and a low portion 124, extending over substantially two-thirds of the circumference of the cam. Said cam engages with a roller 125 mounted on the end of the lever 126, said lever having an off-set at 127. The lever 126 is mounted on the pivot member 128 which extends through suitable pivot openings 129 in the ears 130 depending from the member 116. Pivotally secured to the one end of the lever 126 by means of the pivot pin 131 is a lazy-tongs link mechanism comprising the links 132 mounted on the pivot 131 and the links 133 pivoted thereto by means of the pivots 134. The links 133 are pivoted to the member 116 at 135 and are provided with a pair of curved fingers 136 on the ends thereof. Said fingers 136 are adapted to engage with the filled portion of the casing 100 to hold the same when in the position shown in Fig. 7. It will be seen that this position will be assumed when the end of the lever 126 connected to the lazy-tongs is in its lowered position which is when the high portion 123 of the cam is in engagement with the roller 125. The opposite end of the lever is provided with an eye 137 to which the spring 138 is secured which is secured at its other end to a pin 139 mounted on the bracket member 72', said spring holding the roller 125 in engagement with the face of the cam 122. The roller 125 is mounted between a pair of pivot ears 140 extending laterally from the lever 126 and, accordingly, when the roller is in engagement with the low part of the cam the spring will pull down on the lever 126, thus raising the end thereof connected with the lazy-tongs device thus opening the jaws 136. The cam is so arranged that the jaws 136 grip the sausage 100 when the member 80' is rotating and disengage therefrom to allow the sausages to pass therethrough when the casing 82 is being filled and the member 80' is stationary.

Instead of providing the driving means for the alternately opened and closed valve member described above, a different form of drive may be used as shown in Figs. 9 and 10 in which the main drive shaft 141, mounted between the end members 142 of the framework, is provided with a pair of cams 143 and 144 which engage with rollers 145 and 146 mounted on the pivoted bar 147, said bar being pivoted at 148 on the bracket 149. The bar 147 is connected at one end thereof with a lever 150, a reduced end portion 151 of the bar 147 passing loosely through an opening in the member 150 so as to provide a loose joint between said members 147 and 150. The lever 150 is pivoted at 152 to the side member 142 and is provided with a slot 153 in the end thereof through which the reduced end portion 154 of the lever 155 passes, said lever 155 being pivoted at 156 to the end member 157 of the framework and being connected by means of a pin 158 passing through a slot 159 therein to a crank arm 160 on the valve 161, said valve 161 corresponding to the valve 57 shown in Fig. 1 but being arranged horizontally instead of vertically.

Instead of providing the driving means for the rotating casing twisting member shown in Figs. 1 to 5 inclusive and in Fig. 6, the means shown in Fig. 11 may be provided in which the main drive shaft 162 passing through the side plate 163 of the framework carries a gear 164 keyed thereto which meshes with the gear 165 provided on the rotating member 166 which is mounted to rotate about the filling tube in a similar manner to the member 74, said gear 165 being provided with a projecting pin 167 which is adapted to engage with the pin 168 on the clutch plate 169 which is grooved at 170 to receive the pins 171 on a yoke member 172 provided on the end of the lever 173 pivoted to the framework in any suitable manner at 174 and carrying a roller 175 at the opposite end thereof that engages with a cam 176 having a high portion 177 projecting laterally therefrom, said cam 176 being also keyed to the shaft 162. The clutch plate 169 is normally forced toward the left in Fig. 11 by means of the coil springs 178 mounted on the pins 179 projecting from the plate 180 mounted on the bearing 73' corresponding to the bearing 73 in Fig. 1. Thus, when the roller is in engagement with the low part of the cam the pin 168 is held in such a position that the same is adapted to engage with the pin 167, whereas when the roller 175 is in engagement with high portion 177 of the cam the pin 168 will be held out of engagement with the pin 167. The high portion of the cam extends around substantially two-thirds of the circumference of the cam. Thus the member 168 is held out of engagement with the pin 167 two-thirds of the time and in engagement therewith one-third of the time that the member 165 is rotating, said member 165 rotating constantly. The casing receiving member 181 corresponding to the member 80 in Fig. 1, accordingly rotates only one-third of the time although the gears 164 and 165 are rotating constantly. The arrangement of the cam 177 is such that the member 181 will be rotating only at the time when the filling of the casing has been halted due to the closing of the mechanically operated valve in the passage leading from the stuffing device.

Instead of using rotary valves, as shown in Figs. 1 to 8 inclusive, gate valves may be employed, said gate valves being constructed as shown in Figs. 19 and 20 the valve shown being the valve that is mechanically operated and corresponding to the valve 57. Said valve is operated by means of a lever 182 pivoted at 183 and operated by any of the means previously described for periodically moving the lever in opposite directions so that the end 182 thereof will be raised two-thirds of the time and lowered one-third of the time. Pivotally mounted on the pivot member 184 on the end of the lever 182 is the slidably mounted closure member 185 which is adapted to slide into and out of position to close the opening 186 in the valve member. Said valve 185 is provided with a cross bar 187 which is provided with openings for receiving the bolts 188 mounted on the valve casing 189 and having compression springs 190 coiled therearound for normally holding the member 185 in valve closing position, said springs 190 bearing against the heads 191 on the ends of the bolts 188.

Preferably, the rotating sausage twisting member is provided with means for holding the casing transversely distended to a certain extent so far as to feed the same more efficiently for stuffing and for supplying the proper amount of casing for making the twist therein to form the links. Such a device is shown in Figs. 12 to 15 inclusive, in which the rotating sausage receiving member 192 corresponding to the member 80 shown in Fig. 1 extends over a tube 77' corresponding to the tube 77 shown in Fig. 1, said member 192 being provided with a spring member 193 preferably made of spring wire which is secured at one end thereof by means of a suitable securing means 194 to the member 192, the other end thereof being free, as clearly shown in Figs. 12 and 14. The casing being placed on the member 192, it will be seen, will be distended by the spring 193 with a slight spring pressure. The rotating member 192 is provided with a flange 195 which is provided with a pair of key-hole slots 196 which are adapted to receive the headed studs 197 mounted on the flange 78', which corresponds to the flange 78 in Fig. 1, for detachably holding the member 192 in position.

In Figs. 14 and 15 a different form of securing means is shown for securing the member 192 on the flange member. In this form the member 192 is provided with a flange 198 shorter than the flange 195 which is adapted to be received in a groove 199 in the securing member 200 which corresponds to the flange 78 in Fig. 1. Said securing member 200 is divided into two halves 201 and 202 which are hinged at 203, the member 202 being provided with a catch 204 pressed by means of a spring 205 into position so that the hook 206 thereon will engage with the stud 207 on the member 201, the member 204 being provided with a cam face 208 for directing the hook into proper position for engagement with the stud 207.

Instead of using a single resilient member on a tubular rotating member, as shown in Figs. 12 to 15 inclusive, the arrangement shown in Figs. 16 to 18 inclusive may be used, in which a skeletonized supporting member 209 takes the place of the member 192, said member being provided with longitudinally extending openings 210 and having end flanges 211 and 212, the end flange 212 forming a tubular portion 213 adapted to enter suitable holding means provided on the rotating member 78 and the outwardly directed flange 214 thereon serving as a stop to limit movement thereof toward the left. Secured in any suitable manner to the flange 211 are the spring members 215. Six of these are shown in Figs. 16 to 18 inclusive but any desired number may be provided and it will be evident that with an arrangement such as that shown, the springs will hold the casing distended in all directions. The springs 215 are provided with substantially straight end portions 216 that are slidable on the flange 212 on the opposite end of the skeletonized member 209 from that carrying the flange 211.

In case it is desired to fill casings that are not to be linked it is unnecessary to remove the linking device from the stuffer. All that is necessary is to shut off the electric current to prevent operation of the motor, move the valve operating mechanism to such a position that the valve 57 is open, open the valve 66 as far as possible and open the valve 62 either by means of the handle 60 or the foot pedal 102. The various openings are then of sufficient size that even the coarsest ground meat will pass through the machine. Casings of any size may be filled by providing casing supporting tubes of the proper size therefor.

By providing the quickly demountable casing supporting member shown in Figs. 12 to 15, the casing supporting members can be quickly interchanged, and by providing a plurality of said supporting members with each machine, casings can be placed on said members while off the machine and a casing supporting member with an unfilled casing thereon can be substituted in a few seconds for an empty supporting member from which the casing has been filled and linked.

Having thus described my invention, what I desire to claim and secure by United States Letters Patent is:

1. In a device of the character described, means for containing meat under pressure, a passageway leading therefrom, a twisting mechanism, means in said passageway periodically halting the flow of meat therethrough, and adjustable means constantly under control of the operator for varying the rate of flow of said meat therethrough during operation of said device.

2. In a device of the character described, a twisting mechanism, a meat supply duct leading to said twisting mechanism, means for supplying meat under pressure to said duct, means in said duct alternately opening and closing to permit said meat to periodically flow therethrough, and a controlling valve for controlling the rate of flow of said meat therethrough while said device is operating.

3. In a device of the character described, means for containing meat under pressure, a passageway leading therefrom, a twisting mechanism, means for periodically rotating said twisting mechanism, means in said passageway periodically halting the flow of meat therethrough, and adjustable means under the control of the operator for instantaneously varying the rate of flow of said meat therethrough.

4. In a device of the character described, means for containing meat under pressure, a passageway leading therefrom, a twisting mechanism, means for periodically rotating said twisting mechanism, means in said passageway periodically halting the flow of meat therethrough, adjustable means for varying the rate of flow of said meat therethrough, means controlling the operation of said device, and valve mechanism in said passageway associated with said controlling means closing when said device is stopped and opening when said device is started.

5. In a device of the character described, a twisting mechanism, a meat supply duct leading to said twisting mechanism, means for supplying meat under pressure to said duct, a cut off valve therefor, a valve in said duct, means for alternately opening and closing said valve, and an adjustable valve for varying the rate of flow of the meat through said duct.

6. In a device of the character described, a twisting mechanism, a meat supply duct leading to said twisting mechanism, means for supplying meat under pressure to said duct, a cut off valve therefor, a valve in said duct, means for alternately opening and closing said valve, means for periodically rotating said twisting mechanism when said valve is closed, and an adjustable valve for varying the rate of flow of the meat through said duct.

7. In a device of the character described, a twisting mechanism comprising a rotatable casing supporting member, means for periodically rotating said member, means within said member for supplying meat to the interior of said casing and means for periodically holding the filled portion of said casing against rotation, said means engaging said casing only when said rotatable member is rotating.

8. In a device of the character described, a twisting mechanism comprising a rotatable casing supporting member, means for periodically rotating said member, means within said member for supplying meat to the interior of said casing and means for holding the filled portion of said casing against rotation when said rotatable member is rotating, said means disengaging from said casing when said rotatable member is stationary.

9. In a device of the character described, a twisting mechanism comprising a rotatable casing supporting member, means for periodically rotating said member, means within said member for periodically supplying meat to the interior of said casing when said rotatable member is stationary, and means engaging the filled portion of said casing to hold the same against rotation when said rotatable member is rotating, said means disengaging from said casing when said rotatable member is stationary to permit movement of said casing off said supporting member as the casing is being filled.

10. In a device of the character described, a twisting mechanism comprising a rotatable casing supporting member, means for periodically rotating said member, means within said member for periodically supplying meat to the interior of said casing when said rotatable member is stationary, means for regulating the rate of flow of said meat from said means, and means engaging the filled portion of said casing to hold the same against rotation when said rotatable member is rotating, said means disengaging from said casing when said rotatable member is stationary to permit movement of said casing off said supporting member as the casing is being filled.

11. In a device of the character described, a twisting mechanism comprising a rotatable casing supporting member, means within said member for supplying meat to the interior of said casing, means for holding the filled portion of said casing against rotation and a guard adjacent the end of said rotatable member.

12. In a device of the character described, a twisting mechanism comprising a rotatable casing supporting member, means within said member for supplying meat to the interior of said casing, means for holding the filled portion of said casing against rotation and a guard adjacent the end of said rotatable members, said guard being movable into and out of position adjacent said rotatable member.

13. In a device of the character described, a twisting mechanism comprising a rotatable casing supporting member, means within said member for supplying meat to the interior of said casing, means for holding the filled portion of said casing against rotation, a guard adjacent the end of said rotatable member and means for automatically moving said guard out of position adjacent said rotatable member when the operation of said device is halted.

14. In a device of the character described, a twisting mechanism comprising a casing supporting member, a filling tube within said supporting member, and means for adjusting the flow of meat through said filling tube, said tube having a smooth interior without offsets therein from end to end thereof whereby the same is adapted to fill a casing on said supporting member from end to end thereof without twisting the same with coarsely as well as finely ground meat.

In witness whereof, I hereunto subscribe by name this 3rd day of October, A. D. 1923.

OTTO C. L. HIRSCH.